US008958668B2

(12) United States Patent
Peng et al.

(10) Patent No.: US 8,958,668 B2
(45) Date of Patent: Feb. 17, 2015

(54) PLASMONIC TRANSDUCER HAVING TWO METAL ELEMENTS WITH A GAP DISPOSED THEREBETWEEN

(75) Inventors: Chubing Peng, Minnetonka, MN (US); Yongjun Zhao, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 450 days.

(21) Appl. No.: 13/231,569

(22) Filed: Sep. 13, 2011

(65) Prior Publication Data

US 2013/0064502 A1     Mar. 14, 2013

(51) Int. Cl.

| G02B 6/26 | (2006.01) |
|---|---|
| G02B 6/42 | (2006.01) |
| G11B 5/31 | (2006.01) |
| G11B 5/60 | (2006.01) |
| G02B 6/28 | (2006.01) |
| G11B 7/1387 | (2012.01) |
| G11B 5/00 | (2006.01) |

(52) U.S. Cl.
CPC .............. *G11B 5/314* (2013.01); *G02B 6/4214* (2013.01); *G02B 6/262* (2013.01); *G02B 6/2817* (2013.01); *G02B 6/4206* (2013.01); *G02B 6/4298* (2013.01); *G11B 7/1387* (2013.01); *G11B 2005/0021* (2013.01); *G11B 5/6088* (2013.01)
USPC ................................ 385/31; 216/24; 427/162

(58) Field of Classification Search
CPC .... G02B 6/262; G02B 6/2817; G02B 6/4206; G02B 6/4214; G02B 6/4298
USPC ................................ 385/31; 216/24; 427/162
See application file for complete search history.

(56) References Cited

U.S. PATENT DOCUMENTS

| 5,512,364 | A | 4/1996 | Chiba et al. |
|---|---|---|---|
| 7,330,404 | B2 | 2/2008 | Peng et al. |
| 7,706,654 | B2 | 4/2010 | Peng et al. |
| 8,451,705 | B2 | 5/2013 | Peng et al. |
| 2002/0031291 | A1 | 3/2002 | Montgomery et al. |
| 2009/0116804 | A1* | 5/2009 | Peng et al. ................. 385/131 |
| 2010/0097901 | A1 | 4/2010 | Challener |
| 2010/0123965 | A1 | 5/2010 | Lee et al. |
| 2010/0328807 | A1 | 12/2010 | Snyder et al. |
| 2011/0002199 | A1 | 1/2011 | Takayama et al. |
| 2013/0071062 | A1 | 3/2013 | Chubing et al. |

OTHER PUBLICATIONS

U.S. Appl. No. 13/231,549, filed Sep. 13, 2011, Peng et al.
File History for U.S. Appl. No. 13/231,549.
File History for U.S. Appl. No. 13/675,776.
File History for U.S. Appl. No. 13/231,549 retrieved from the U.S. Patent and Trademark Office Pair System on Oct. 9, 2014, 130 pages.
File History for U.S. Appl. No. 13/675,776 retrieved from the U.S. Patent and Trademark Office Pair System on Oct. 9, 2014, 160 pages.

* cited by examiner

*Primary Examiner* — Jerry Blevins
(74) *Attorney, Agent, or Firm* — Hollingsworth Davis, LLC

(57) ABSTRACT

A plasmonic transducer includes at least two metal elements with a gap therebetween. The metal elements are elongated along a plasmon-enhanced, near-field radiation delivery axis. Cross sections of the metal elements in a plane normal to the delivery axis vary in shape along the delivery axis. A waveguide is disposed along an elongated side of the plasmonic transducer. The waveguide is optically coupled to the plasmonic transducer along the elongated side.

19 Claims, 17 Drawing Sheets

PLASMONIC TRANSDUCER HAVING TWO METAL ELEMENTS WITH A GAP DISPOSED THEREBETWEEN

SUMMARY

Various embodiments described herein are generally directed to a near-field transducers that may be used, e.g., for heat assisted magnetic recording. In one embodiment, a plasmonic transducer includes at least two metal elements with a gap therebetween. The metal elements are elongated along a plasmon-enhanced, near-field radiation delivery axis. Cross sections of the metal elements in a plane normal to the delivery axis vary in shape along the delivery axis. A waveguide is disposed along an elongated side of the plasmonic transducer. The waveguide is optically coupled to the plasmonic transducer along the elongated side.

In another embodiment, a method involves delivering light via a channel waveguide to an elongated portion of a plasmonic transducer that includes at least two metal elements with a gap therebetween. The metal elements and the waveguide are coupled along a plasmon-enhanced, near-field radiation delivery axis. Cross sections of the metal elements in a plane normal to the delivery axis vary in shape along the delivery axis. The method also involves providing a surface plasmon-enhanced, near-field radiation pattern proximate the output end of the plasmonic transducer in response to the receiving the light In another embodiment, an apparatus includes a plasmonic transducer that includes at least two metal elements with a gap therebetween. The metal elements are elongated along a plasmon-enhanced, near-field radiation delivery axis. Each of the elements includes at least: a tip portion proximate an output end of the plasmonic transducer and having a first cross sectional area relative to a plane normal to the delivery axis; a coupling portion at an input end of the plasmonic transducer and having a second cross sectional area relative to the plane that is greater than the first cross sectional area; and a taper portion coupled between the tip portion and the coupling portion, wherein the taper portion varies from the first to the second cross sectional area along the delivery axis.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure relates to a gap-plasmon, near-field transducer (NFT) that is generally formed by tapering a slot waveguide. The NFT may include three sections. The first section excites the gap-plasmon by evanescent coupling from a dielectric channel waveguide. The second section tapers the gap-plasmon waveguide to achieve a desired optical spot size. The third section facilitates impedance matching to couple light into a storage medium. An NFT of this configuration may be usable in applications such as heat-assisted magnetic recording (HAMR), also sometimes referred to as thermal-assisted magnetic recording.

Figure 14:
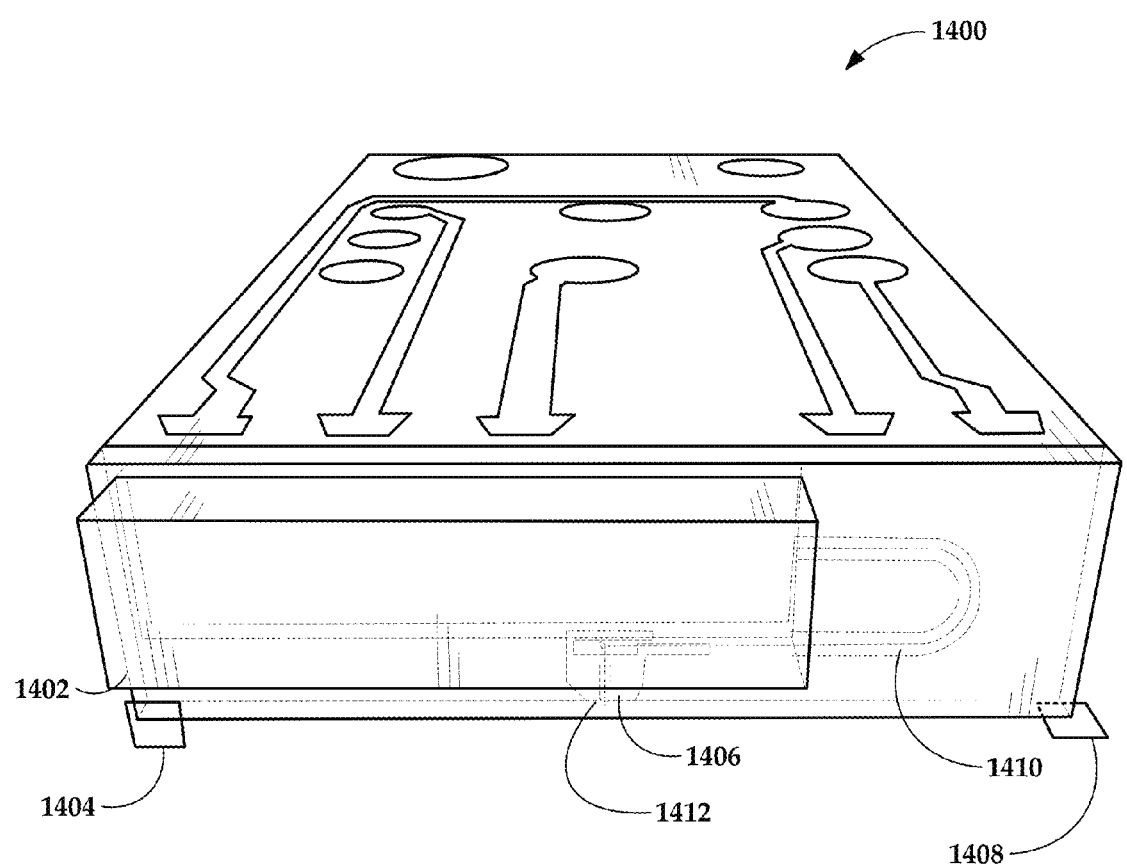
FIG. 14 is a perspective view of a thermal assisted recording slider utilizing a near field transducer and waveguide according to an example embodiment.

It will be appreciated that the NFT and waveguide described herein may be usable in any situation where a beam of highly focused and relatively powerful electromagnetic energy is desired. As mentioned above, one such application is in thermal/heat assisted magnetic recording, referred to as HAMR. In reference now to FIG. 14, a perspective view shows an example HAMR slider 1400. This example slider 1400 includes an edge-emitting laser diode 1402 integrated into a trailing edge surface 1404 of the slider 1400. The laser diode 1402 is proximate to a HAMR read/write head 1406, which has one edge on an air bearing surface 1408 of the slider 1400. The air bearing surface 1408 faces and is held proximate to a moving media surface (not shown) during device operation.

The laser diode 1402 provides electromagnetic energy to heat the media surface at a point near to the read/write head 1406. Optical coupling components, such as a waveguide 1410, are formed integrally within the slider device 1400 to deliver light from the laser 1402 to the media. In particular, a local waveguide and NFT 1412 may be located proximate the read/write head 1406 to provide local heating of the media during write operations. While the laser diode 1402 in this example is an integral, edge firing device, it will be appreciated that the waveguide/NFT 1412 may be applicable to any light source and light delivery mechanisms. For example, surface emitting lasers (SEL) may be used instead of edge firing lasers, and the slider may use any combination of integrated and external lasers.

A HAMR device utilizes the types of optical devices described above to heat a magnetic recording media (e.g., hard disk) in order to overcome superparamagnetic effects that limit the areal data density of typical magnetic media. In order to record on this media, a small portion of the media is locally heated while being written to by a magnetic write head. A coherent light source such as a laser may provide the energy to create these hot spots, and optical components, e.g., built in to a slider that houses the write head, are configured direct this energy onto the media.

When applying light to a HAMR medium, the light is concentrated into a small hotspot over the track where writing takes place. To create this small hot spot, energy from a light source (such as a laser that is integral to or separate from the write head) may be launched into a waveguide integrated into a hard drive head. The light propagates through the waveguide and may be coupled to an optical NFT, e.g., either directly from the waveguide or by way of a focusing element.

The NFT may be located at an air bearing surface (ABS) of a slider, and may be placed in close proximity to a write head that is also part of the slider. This co-location of the NFT with the write head facilitates heating the hot spot during write operations. The waveguide and NFT may be formed as an integral part of the slider that houses the write head. Other optical elements, such as couplers, mirrors, prisms, etc., may also be formed integral to the slider. The optical elements used in HAMR recording heads are generally referred to as integrated optics devices.

The field of integrated optics relates to the construction of optics devices on substrates, sometimes in combination with electronic components, to produce functional systems or subsystems. For example, an integrated optics device may transfer light between components via rectangular dielectric slab or channel waveguides that are built up on a substrate using layer deposition techniques. These waveguides may be formed as a layer of materials with appropriate relative refractive indices so that light propagates through the waveguide in a similar fashion as through an optic fiber.

As a result of what is known as the diffraction limit, optical components cannot be used to focus light to a dimension that is less than about half the wavelength of the light. The lasers used in some HAMR designs produce light with wavelengths on the order of 800-900 nm, yet the desired hot spot is on the order of 50 nm or less. Thus the desired hot spot size is well below half the wavelength of the light, and optical focusers cannot be used to obtain the desired hot spot size, due to diffraction. As a result, an NFT is employed to create these hotspots on the media.

The NFT is a near-field optics device designed to reach local surface plasmon conditions at a designed wavelength. A waveguide and/or other optical element concentrates light on a transducer region (e.g., focal region) near which the NFT is located. The NFT is designed to achieve surface plasmon resonance in response to this concentration of light. At resonance, a high electric field surrounds the NFT due to the collective oscillations of electrons at the metal surface. Part of this field will tunnel into a storage medium and get absorbed, thereby raising the temperature of a spot on the media as it being recorded.

Figure 1:
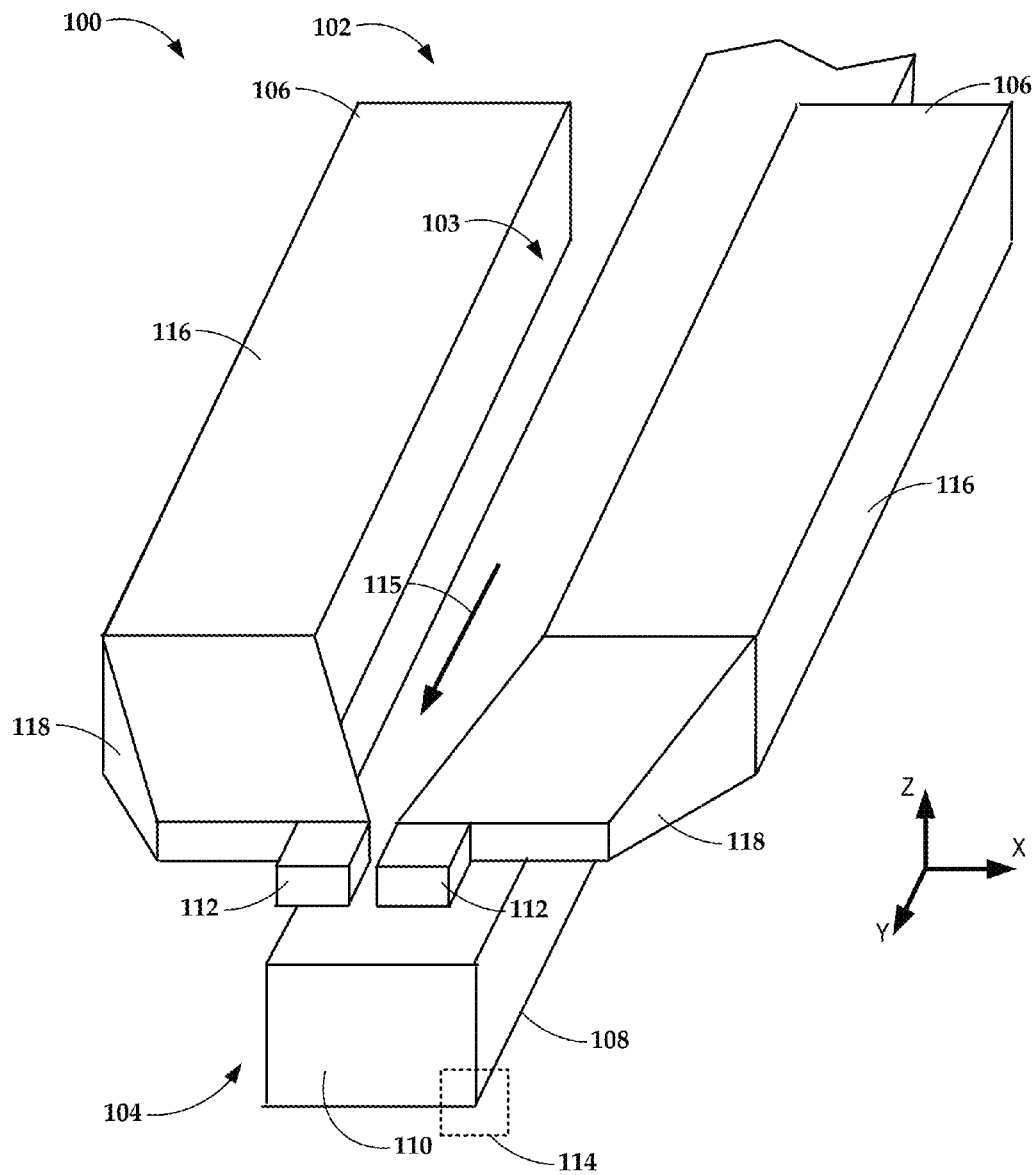
FIG. 1 is a perspective view of a near-field transducer and dielectric channel waveguide according to an example embodiment.

In reference now to FIG. 1, a perspective view illustrates an apparatus 100 having gap-plasmon NFT 102 and associated dielectric, channel waveguide 104 according to an example embodiment. The plasmon NFT 102 includes first and second metal elements 106 that may be formed of a metal such as gold (Au). The metal elements 106 are arranged side-by-side with a gap 103 disposed therebetween. In this arrangement, the gap 103 and elements 106 can be considered to form a waveguide, herein referred to as a "slot waveguide," to differentiate from light delivery, channel waveguide 104. A lower surface of the metal elements 106 (e.g., surface proximate the waveguide 104) may reside on a common plane that is parallel to a substrate plane, e.g., a plane on which the various components are built using wafer fabrication techniques.

The three-dimensional channel waveguide 104 includes a core 108 that may be formed from a dielectric material such as TiOx, $Ta_2O_5$, ZnS, and SiNx. It will be appreciated that, within the apparatus 100, components 106, 108 may be surrounded by other materials (e.g., dielectric materials such as alumina) that are manufactured with components 106, 108 by, e.g., using wafer fabrication techniques. For example, the waveguide core 108 is generally surrounded by a material having a different index of refraction, thereby acting as cladding for the waveguide 104 (see, e.g., cladding 223 in FIG. 2A). For purposes of clarity, those surrounding materials are not shown in FIG. 1.

In the orientation of FIG. 1, a media-facing surface 114 of the apparatus 100 (e.g., ABS) is arranged parallel to the x-z plane. An end 110 of the waveguide core 108 may be disposed proximate the media writing surface 114, as well as respective tip portions 112 of the metal elements 106. Light is delivered from the waveguide 104 along the positive y-direction where it is coupled to the NFT 102. The NFT 102 delivers surface plasmon enhanced, near-field electromagnetic energy along the positive y-axis (e.g., the delivery axis 115) where it exits the media writing surface 114. This may result in highly localized hot spot on media (not shown) when placed in close proximity to surface 114.

The metal elements 106 may include three different portions. A first portion 116 is a directional coupler that may include elongated bars/plates of substantially constant cross-sectional shape (at least in xz-planes along the y-direction). This portion 116 excites the gap-plasmon by evanescent coupling from the waveguide 104. A second portion 118 tapers the gap-plasmon waveguide to achieve a desired optical spot size. This portion 118 may include a taper in both the x- and z-directions to form a narrower gap along the x-direction (which corresponds to a cross-track direction in a magnetic disk drive apparatus) and a thin film along the z-direction (down-track). The third portion is the aforementioned tip 112, which facilitates impedance matching between the slot waveguide 104 and a storage medium, thereby facilitating efficient light delivery.

Figure 2A:
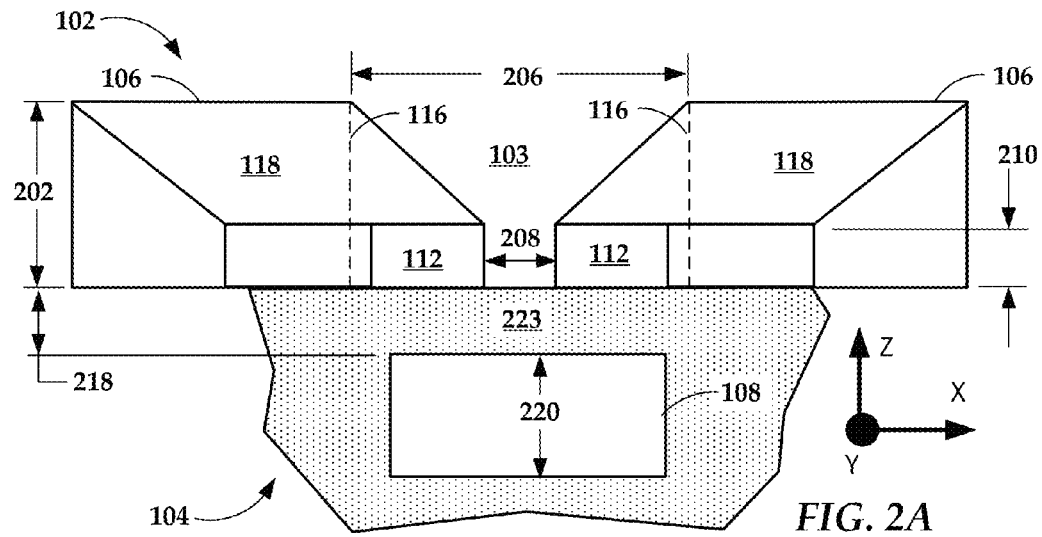
FIGS. 2A and 2B are front and top views of the near-field transducer and waveguide shown in FIG. 1.
Figure 2B:
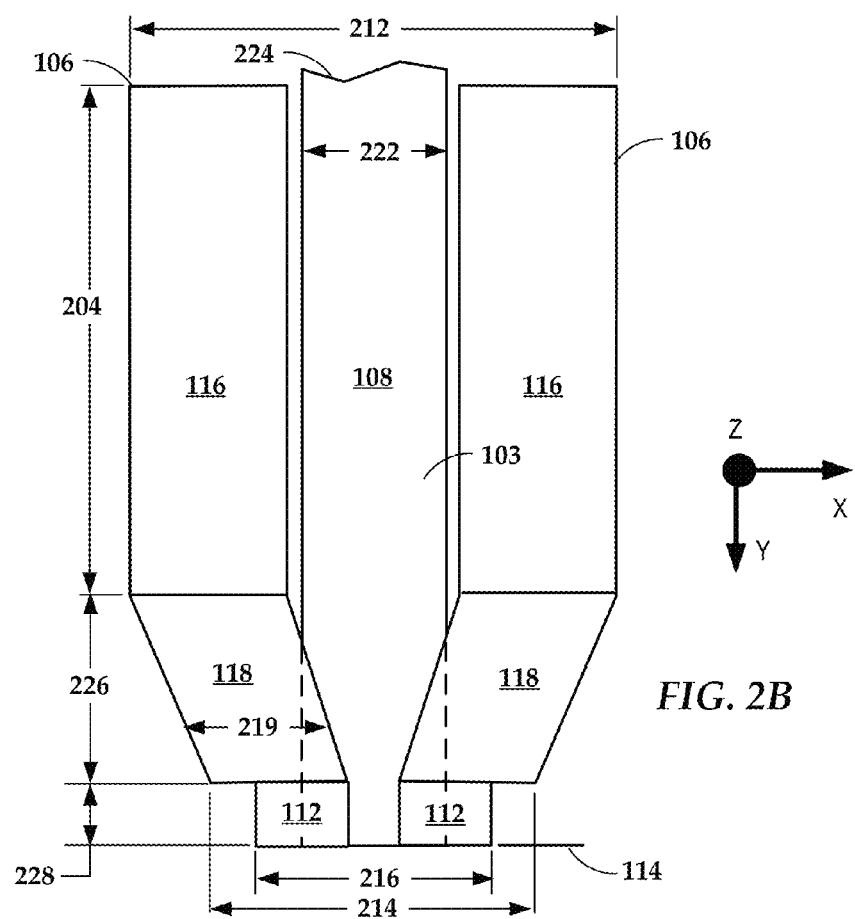

In reference now to FIGS. 2A and 2B, FIG. 2A shows a front (xz-plane) view of the waveguide 104 and NFT 102 of FIG. 1, and FIG. 2B shows a top (xy-plane) view of the waveguide 104 and NFT 102 of FIG. 1. For purposes of the following discussion, various dimensions are defined in FIGS. 2A and 2B. The metal elements 106 may be assumed as symmetrical for purposes of the present discussion, although the embodiments need not be so limited. The first portions 116 of the elements 106 have a height 202 and length 204. These portions 116 are separated by a distance 206, which also defines width of the gap 103 along these portions 116. Tip portions 112 are separated by a smaller gap, 208, which may be considered as a continuation of waveguide gap 103. The tip portions 112 have a height 210, which is generally smaller than the height 202 of the first portion 116.

The tapered portion 118 acts as a transition between the first portion 116 and the tip portion 112. As shown here, the tapered portion includes a linear transition from respective height 202 to height 210. Similarly, the tapered portion 116 has a linear transition between the gap spacing from 206 to 208. While the outer width 214 near the tip is shown smaller than width 212, this tapering may not be necessary. The widths (e.g., width 219 seen in FIG. 2B) of tapered portions 118 along the x-direction do not change along the y-direction, and are much larger than the skin-depth of the plasmonic material used for elements 106, such as Au, Ag. As a result, the width 214 can be chosen based on heat-dissipation requirements without significantly impacting NFT efficiency. It will be appreciated that one or more of these transitions may use an alternate curve/shape, e.g., rounded, parabolic, exponential, etc. Also, there is no tapered transition between the outer width 216 of tip portions 112 and width 214, although one could be provided.

The waveguide core 108 is disposed below the metal portions 106, separated by a distance 218 in the z-direction. The waveguide core itself has a height 220 and width 222. The waveguide 104, which includes core 108 and cladding 223, may extend any distance in the negative y-direction, as indicated by the broken edge 224 in FIG. 2B. In this example, the core 108 is shown disposed along the entire length of NFT elements 106, which includes respective lengths 204, 226, and 228 of portions 116, 118, and 112. However, in other embodiments, the core 108 need not extend over the entire NFT length, e.g., may be terminated before the media surface 114. Generally, a region defined by coupling length 204 (and possibly length 226) is generally considered to be the area of primary coupling between the waveguide 104 and NFT 102.

The optical characteristics of apparatus 100 were modeled based on an assumed light wavelength of $\lambda=830$ nm. The dielectric channel waveguide 104 was modeled as having a TiOx core 108 with $Al_2O_3$ cladding 223. The index of refraction $n=2.30$ for TiOx, and $n=1.65$ for $Al_2O_3$. The channel waveguide width 222 was set to 340 nm, and height 220 was set to 300 nm. The material for the gap 103 of the slot waveguide 102 (and portions thereinabove) was also modeled as being the same as the cladding 223, namely $Al_2O_3$. The metal elements 106 were modeled as Au ($n=0.188+j\ 5.39$). These elements 106 act as cladding for the slot waveguide formed by the elements 106 and dielectric material in the gap 103.

Figure 3A:
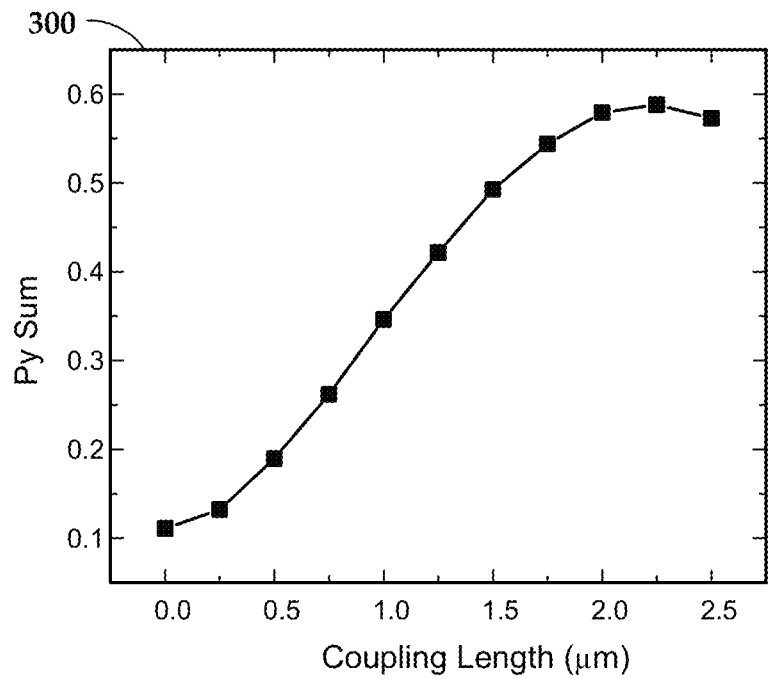
FIG. 3A is a graph showing optical power transfer as a function transducer coupling length according to an example embodiment.

A graph 300 in FIG. 3A shows optical power transfer from the TiOx core 108 to the slot waveguide NFT 102 for different coupling distances 204. In the modeling the slot waveguide gap distance 206 was 300 nm, height 202 was 200 nm, and spacing 218 was 50 nm. For purposes of this modeling, the slot width 212 was assumed to be infinite. It can be seen in graph 300 that ~60% optical power is transferred to the gap-plasmon of the slot waveguide at when length 204 is set to 2.0 μm. Note that the optimized length 204 may be dependent on the spacing 218 between two waveguides.

To evaluate the efficiency of the NFT 102, a storage medium was modeled as being placed proximate the media writing surface 114. The storage media in this model included a 12.6-nm thick Fe recording layer ($n=2.94+j\ 3.41$), a 20-nm thick MgO layer ($n=1.7$), and a 60-nm thick Cu heat-sink layer ($n=0.26+j\ 5.26$) on a glass substrate. The NFT-media spacing was 8-nm with effective index of refraction $n=1.2116$. The heat capacity C (unit: $J/cm3/K$) and thermal conductivity K (unit: $J/cm/s/K$) was (C, K)=(3.14, 0.05) for the MgO layer, (3.49, 4.0) for the Cu layer, and (2.18, 0.01) for the glass substrate. It was assumed that the magnetic layer has anisotropic thermal conductivity: in-plane $K=0.05$, out of plane $K=0.4$ ($C=3.62$ for the magnetic layer). The results of this modeling can be seen in FIG. 3B.

Figure 3B:
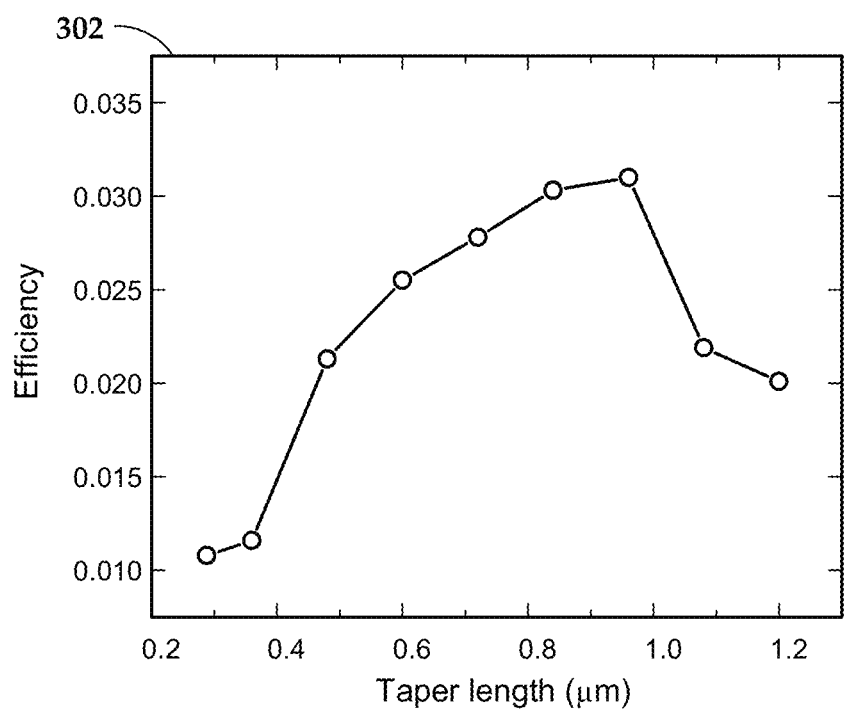
FIGS. 3B, 4A and 4B are graphs showing numerical modeling results of optical power absorbed in a recording layer as a function of near-field transducer dimensions according to example embodiments.

Graph 302 in FIG. 3B shows the optical power absorbed in the recording layer in a 50 nm by 50 nm footprint as a function of taper length 226, with tip length 228 being set to 50 nm, and tip width 216 being set to 200 nm. Peak efficiency of over 30% is seen for a tip length 228 between 0.8 and 1.0 μm. Graphs 400 and 402 in FIGS. 4A and 4B also show a similar estimate of absorbed optical power as in graph 302 for different dimensional values of the NFT 102. In graph 400, tip length 228 is varied from 20 nm to 160 nm, with taper length 226 being set to 840 nm, and tip width 216 being set to 200 nm. In graph 400, maximum efficiency is seen at tip length 228 of around 90 nm, or approximately 31.5 times the combined taper and coupling lengths 226, 204 of 2840 nm.

Figure 4A:
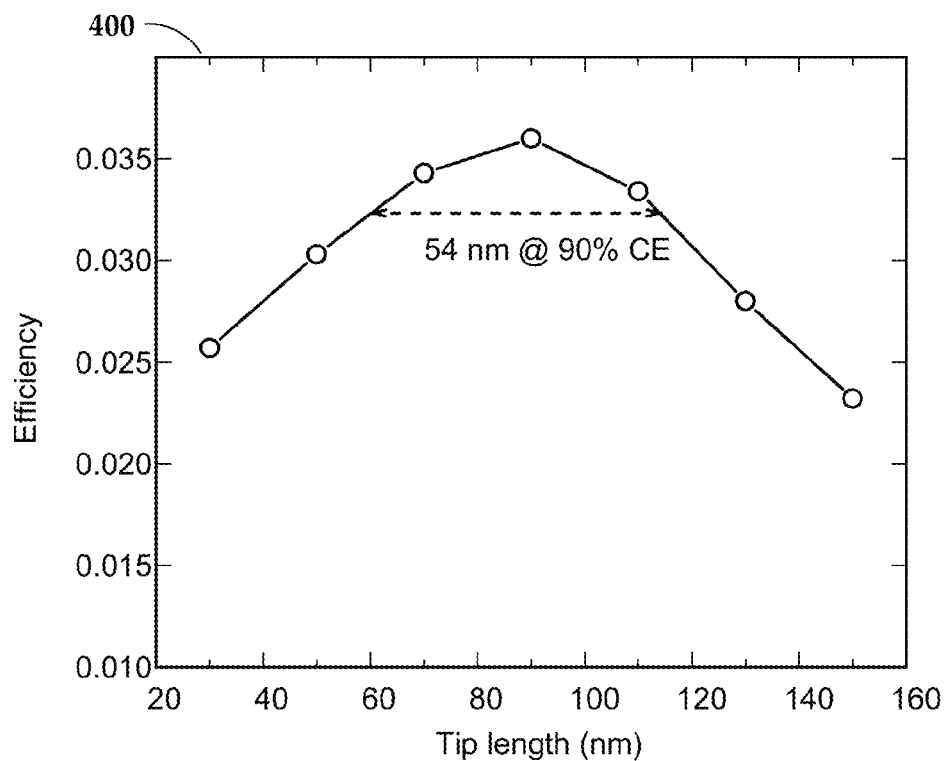
Figure 4B:
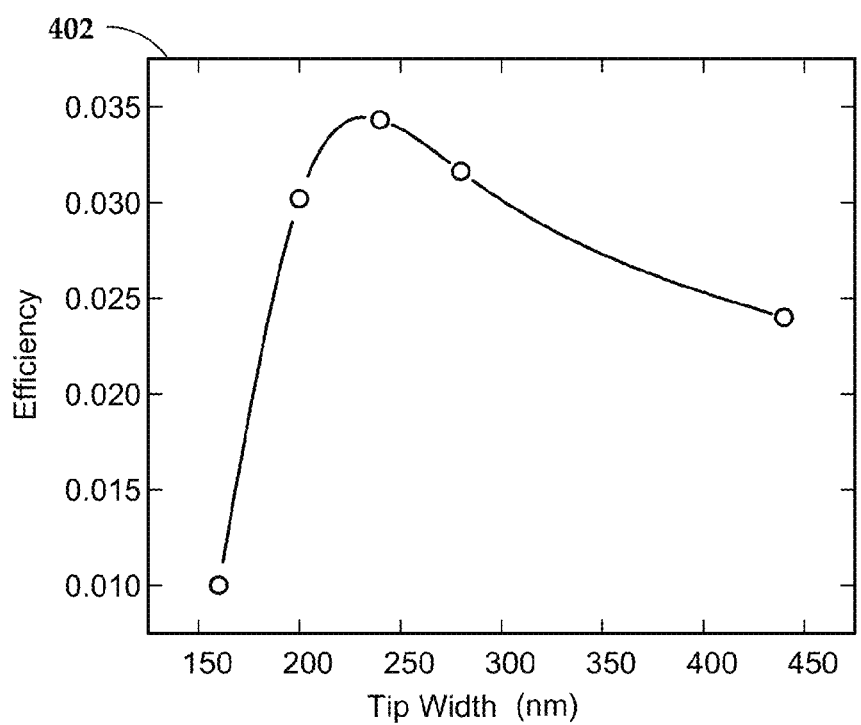

The peak efficiencies in FIGS. 3B, 4A, and 4B are above 30%. Laboratory testing has found that 25-50 mW can be delivered to an NFT from a 50-100 mW laser diode. To achieve a hotspot above the Curie temperature for the media of this example, a temperature rise of around 250-300K within the hotspot is desired. As shown below (e.g., described in relation to FIG. 7A below) this temperature rise can be achieved by delivering approximately 10 mW incident optical power to the media. As a result, the 30% efficiencies of this NFT design (and variations thereof) indicate the design is viable for HAMR applications, at least within these design parameters and analysis assumptions. Also note that in graph 400, tip length 228 has a 54 nm margin at 90% efficiency. This represents achievable lapping tolerances using current manufacturing processes. As a result, it is also expected the efficiencies shown in FIGS. 3B and 4A and 4B are achievable in production devices with existing processes.

Figure 5A:
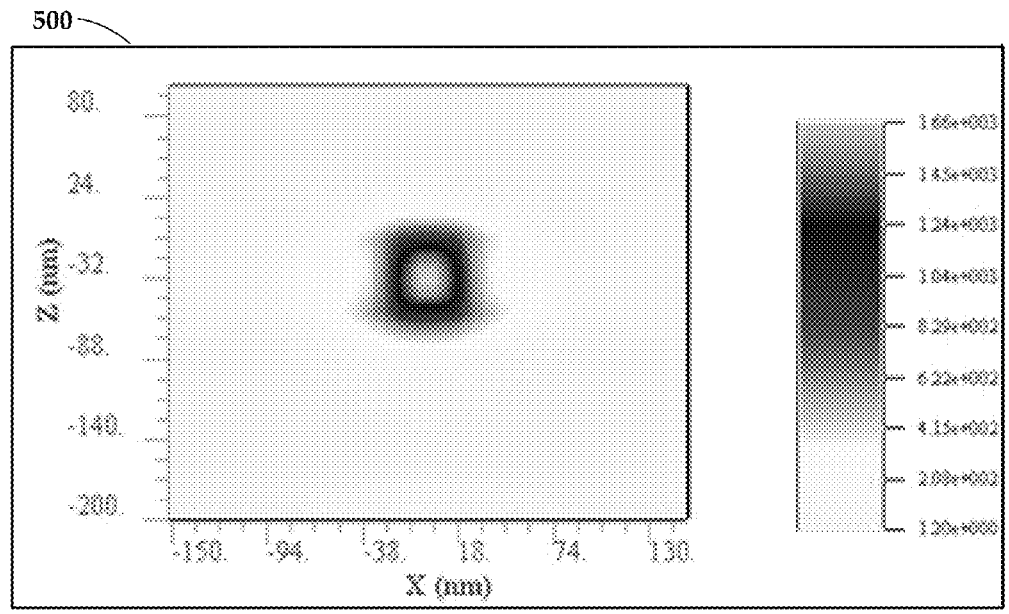
FIG. 5A is a graph illustrating a calculated light absorption profile in the middle of a recording layer for a near-field transducer according to an example embodiment.

In graph 402, tip width 216 is varied from 150 nm to 450 nm, with taper length 226 being set to 840 nm and tip length 228 being set to 90 nm. In FIG. 5A, a graph 500 shows an estimation of light absorption profile in the middle of the recording layer. The slot waveguide is tapered down from height 202 of 200 nm to height 210 of 40 nm, and gap width 206 of 300 nm to gap width 208 of 40 nm. At the 40 nm gap 208, the full width at half maximum (FWHM) of the optical spot at the medium is 45 nm along x-direction (cross-track) and 60 nm along z-direction (down-track). Again, this FHWM value is deemed viable for HAMR applications.

Figure 5B:
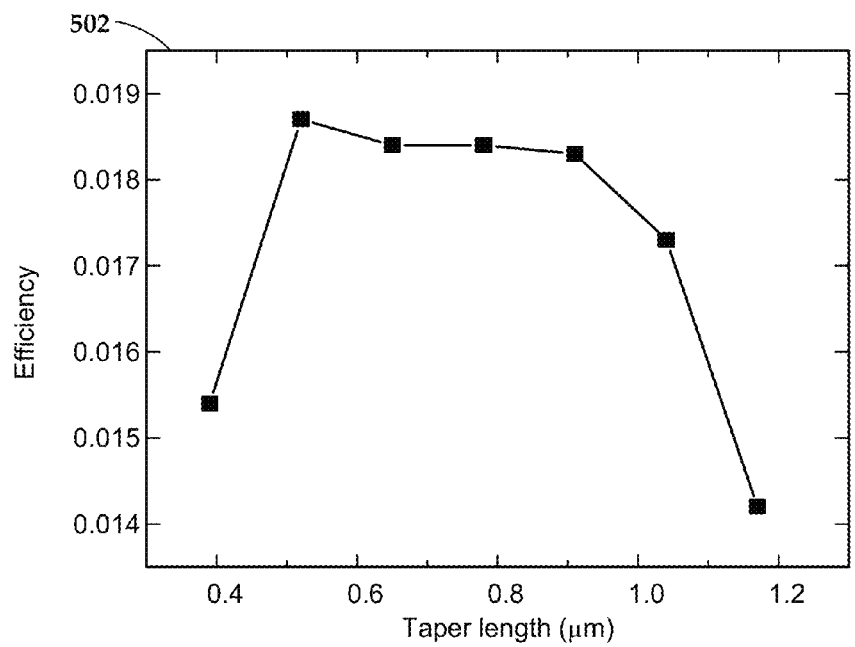
FIGS. 5B and 6A are graphs showing numerical modeling results of optical power absorbed in a recording layer as a function of near-field transducer dimensions according to additional example embodiments.
Figure 6A:
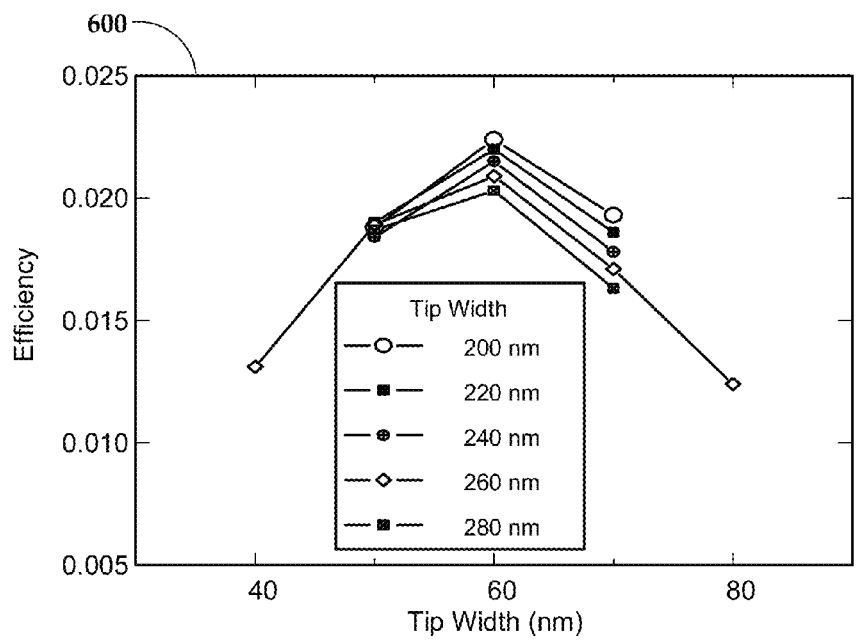
Figure 6B:
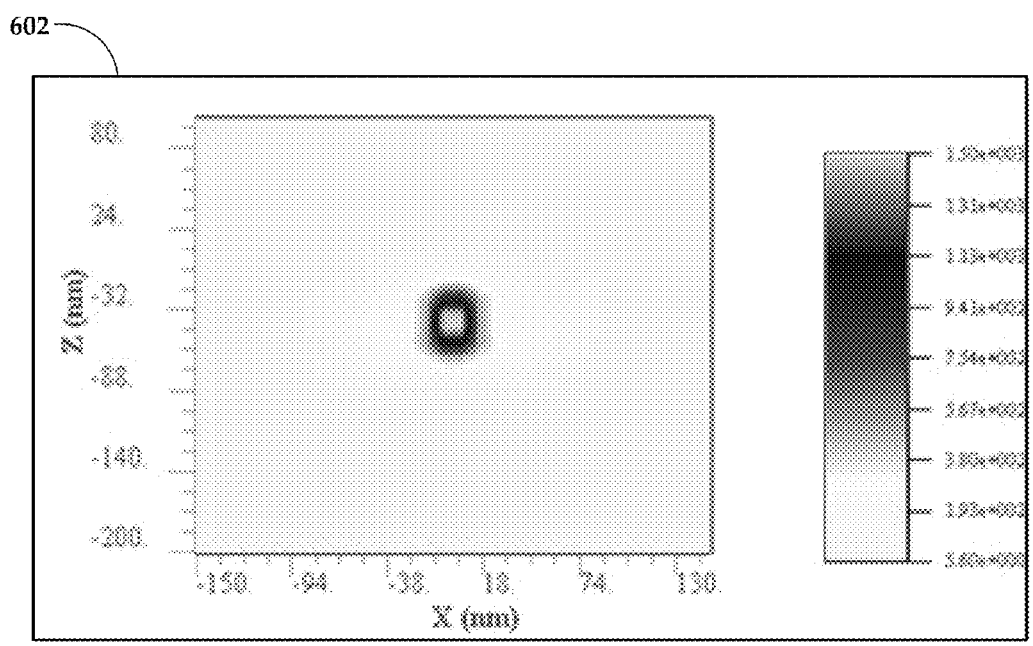
FIGS. 6B and 7A are graphs showing respective energy absorption profiles and temperature rise in the middle of a recording layer according to additional example embodiments.
Figure 7A:
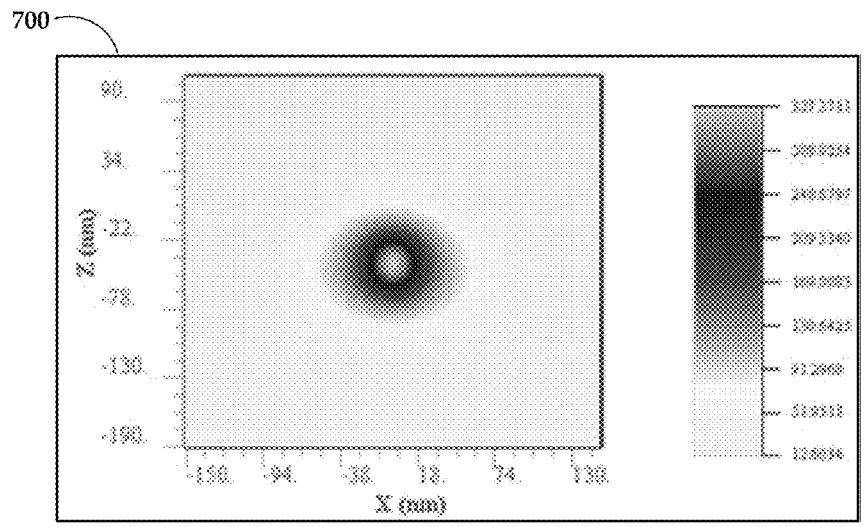

For ultrahigh recording density applications, even smaller optical spots may be required. In reference now to FIGS. 5B, 6A, 6B, and 7A, graphs show an optimization for a configuration with a 20 nm gap 208. In this case, tip height 210 was set to 20 nm, tip width 216 to 240 nm, and tip length 228 to 50 nm. In FIG. 5B, graph 502 shows light absorption efficiency as taper distance 226 is varied from 400 to 1200 nm. In FIG. 6A, graph 600 shows light absorption efficiency as a tip length 228 is varied in ranges between 40 nm and 80 nm, and further wherein tip width 216 is varied from 200 nm to 280 nm. In graph 600, taper length 226 is fixed at 650 nm. These results indicate that the NFT can provide acceptable results even given large tolerances in tapering and lapping operations. While peak efficiencies shown in FIGS. 5B and 6A are lower than those shown in 3B and 4B, respectively, these dimensions result in smaller hotspots, as seen in FIGS. 6B and 7A. This may be an acceptable trade off in many applications.

In FIGS. 6B and 7A, graphs 602 and 700 respectively show profiles of energy absorption and temperature rise in the middle of the recording layer for a 20-nm gap configuration. For the 20 nm gap plasmon, the optical spot size becomes 26 nm along x-direction (cross-track) and 39 nm along z-direction (down-track). Compared to the 40 nm gap, the 50 nm-by-50 nm footprint efficiency drops from 0.035 to 0.022 but the peak absorption is only slightly reduced. Illumination of 10-mW incident optical power raises the peak temperature over 300K at time=2 ns. The FWHM thermal spot size is 54 nm along x-direction and 57 nm along z-direction. Therefore, this demonstrates that the design can be optimized for smaller hotspots, even with a slight reduction in light absorption efficiency.

Figure 7B:
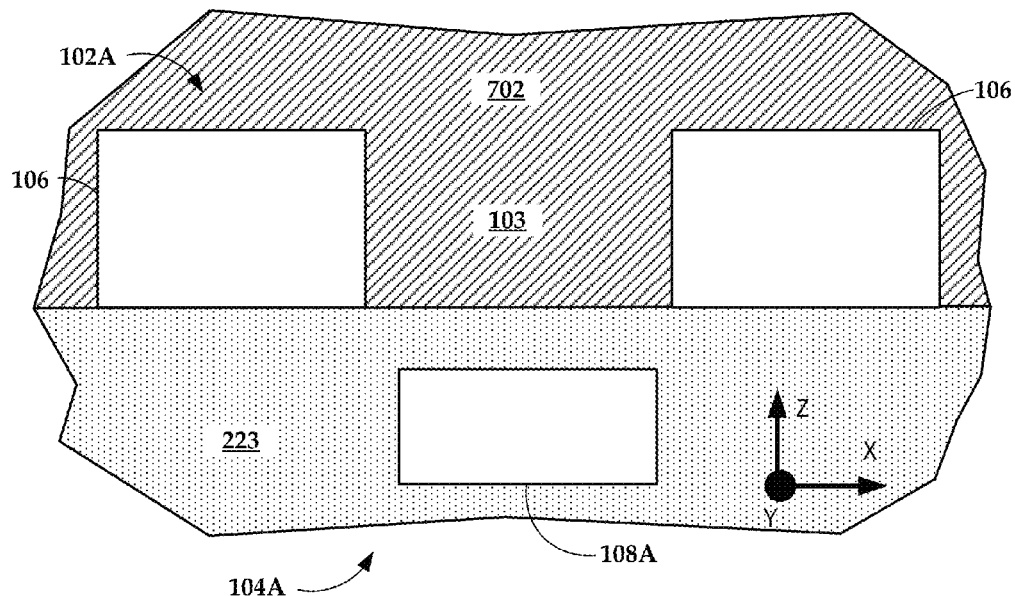
FIG. 7B is a cross sectional view of a near filed transducer and waveguide according to another example embodiment.

In reference now to FIG. 7B, a diagram illustrates a configuration of an NFT 102A and waveguide 104A according to another example embodiment. As was described in relation to FIG. 2A, the channel waveguide 104 includes cladding 223 of $Al_2O_3$. However, in this configuration the core 108A is formed from $Ta_2O_5$ (n=2.1) instead of $TiO_x$. Also, while the metal elements 106 may be formed from the same plasmonic metal (e.g., Au) as shown in FIG. 2A, in this configuration, the gap 103 is filled with a different material 702 ($SiO_2$, n=1.47), and this material 702 also surrounds the upper sides of the elements 106. Using a gap material 702 of low index of refraction reduces the effective mode index of the slot waveguide NFT 102A, thereby lowering the index of refraction of the dielectric channel waveguide core 108A required for phase-match between the dielectric waveguide 104A and the slot waveguide 102A for efficient optical power transfer.

The optical and thermal performance of the configuration was modeled using a similar analysis as before. For convenience, the same reference numerals used in describing dimensions of NFT 102 and waveguide 104 in FIG. 2A are also used in the description of analogous dimensions of NFT 102A and 104A in FIG. 7B. In the analysis, the core 108A has width 222 of 360 nm and height 220 of 300 nm. The slot waveguide 102A is tapered down from a height 202 of 200 nm to height 210 of 20 nm. The gap is tapered from width 206 of 300 nm a width 208 of 20 nm. The spacing 218 between the $Ta_2O_5$ core 108A and slot waveguide 102A is 50 nm. Other simulation parameters (e.g., related to elements 106 and target media) are the same as previously described.

Figure 8A:
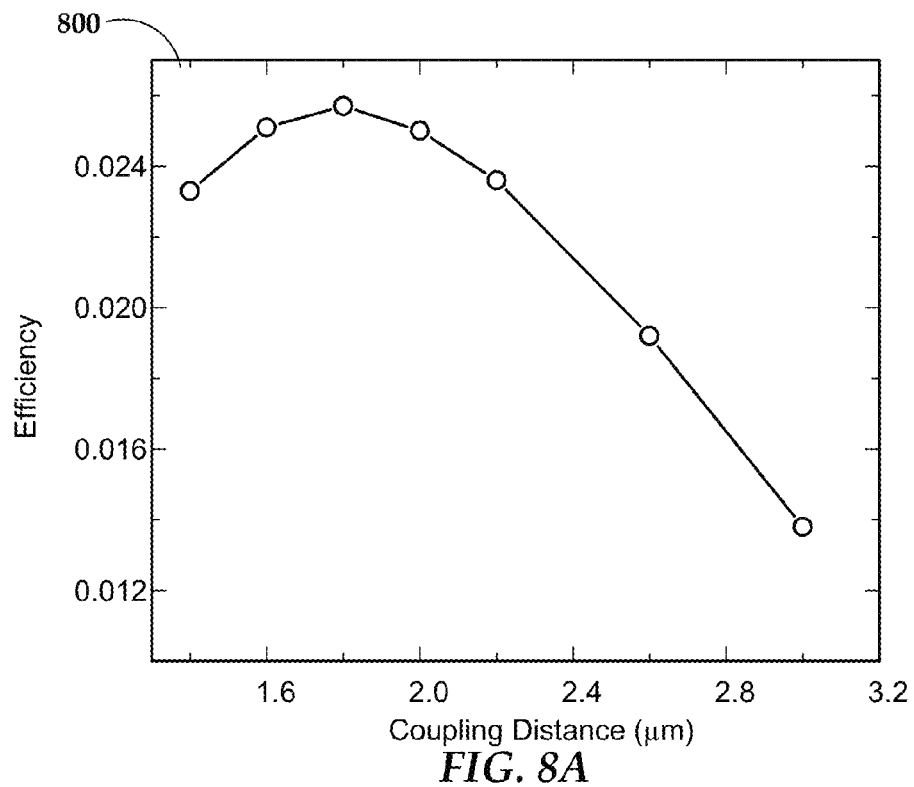
FIGS. 8A-8B, 9A-9B, and 10 are graphs showing numerical modeling results of optical power absorbed in a recording layer as a function of near-field transducer dimensions according to additional example embodiments.
Figure 8B:
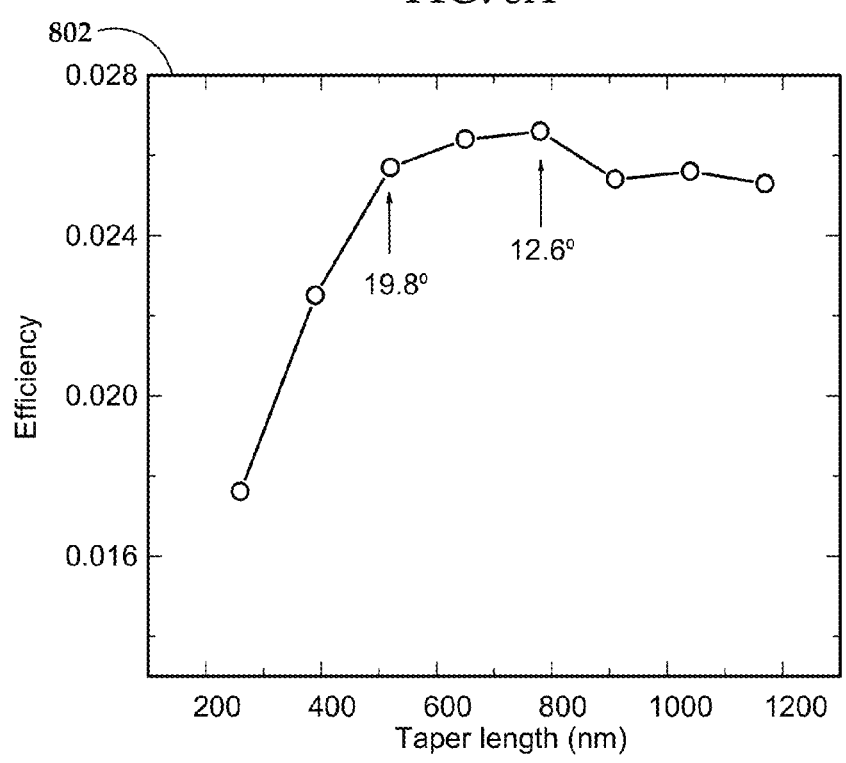

In FIG. 8A, graph 800 shows optical power absorbed in a 50 nm by 50 nm media footprint from the $Ta_2O_5$ 104A to the slot waveguide NFT 102A as a function of coupling length 204. For these results 800, the slot waveguide taper length 226 is 520 nm, tip length 228 is 70 nm, and tip width 216 is 200 nm. In FIG. 8B, graph 802 shows optical power absorbed as a function of taper length 226, where coupling length 204 is 1800 nm, tip length 228 is 70 nm, and tip width 216 is 200 nm.

Figure 9A:
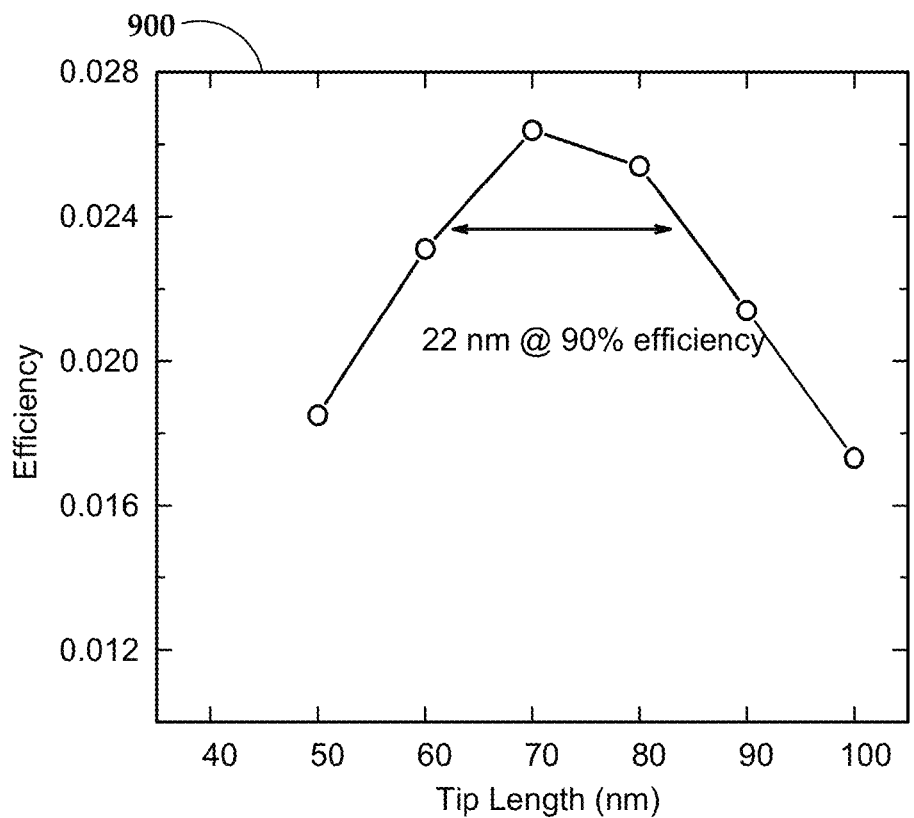
Figure 9B:
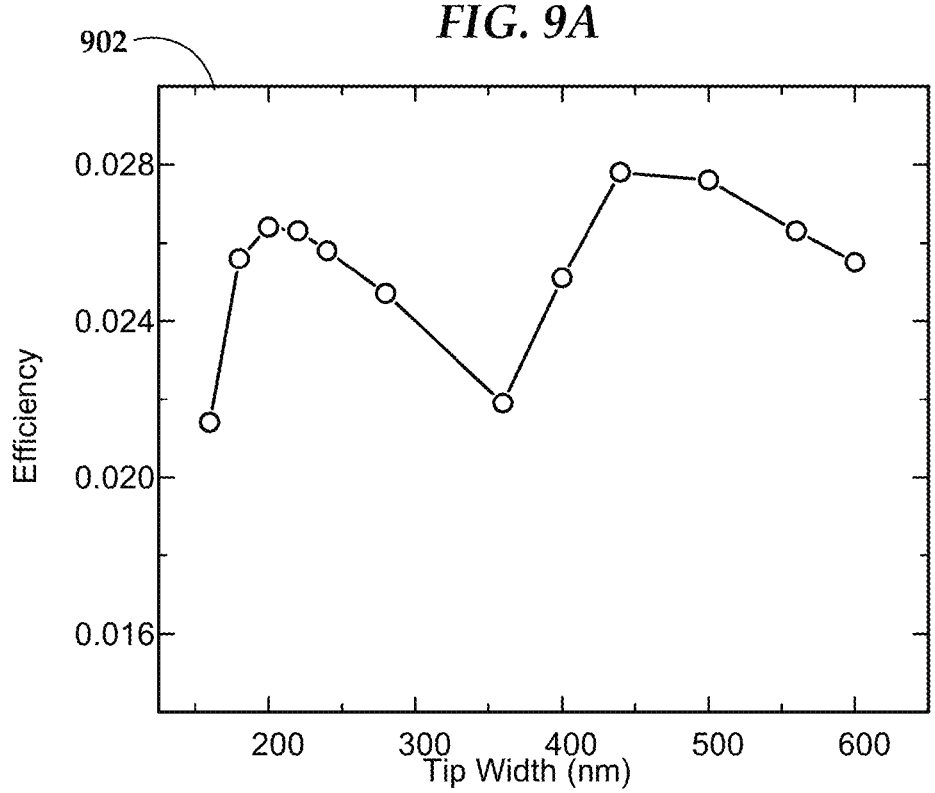
Figure 10:
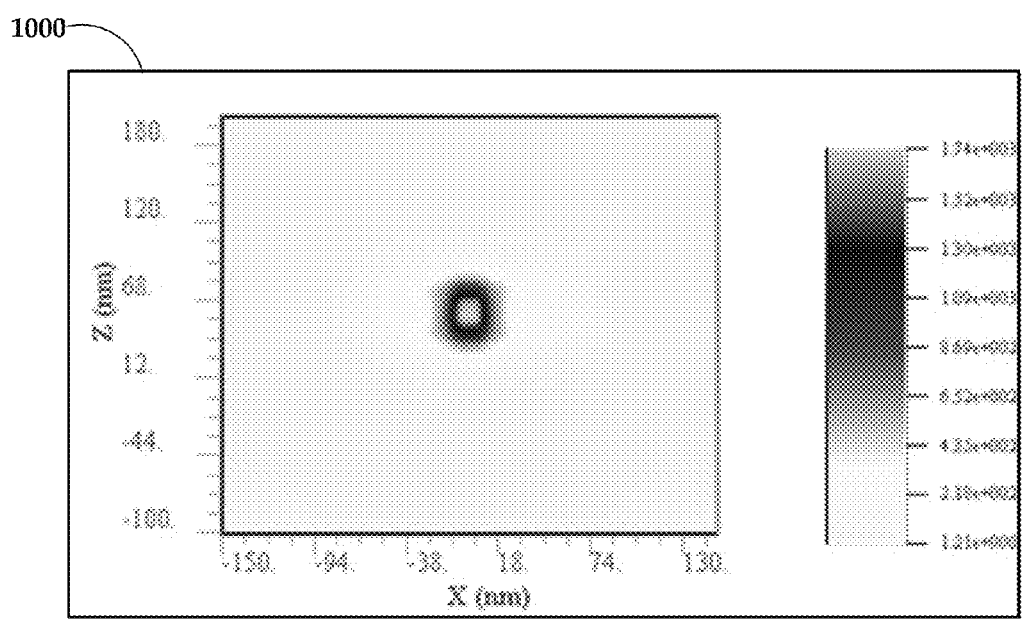

In FIG. 9A, graph 900 shows the optical power absorbed in the recording layer as a function of tip length 228, where coupling length 204 is 1800 nm, taper length 226 is 650 nm, and tip width 216 is 200 nm. With an 650 nm taper length 226 and 1800 nm coupling length 204, maximum efficiency is seen at tip length 228 of around 70 nm, or about 35 times the combined taper and coupling length 226, 204. In FIG. 9B, graph 902 shows the optical power absorbed in the recording layer as a function of tip width 216, where coupling length 204 is 1800 nm, taper length 226 is 650 nm, and tip length 228 is 70 nm. Graph 1000 of FIG. 10 shows expected profile of light absorption in the middle of the recording layer for this configuration. This shows the energy concentrated well within desired hotspot with dimensions of less than 50 nm by 50 nm.

It can be seen from these results that slightly better light delivery efficiency may be obtained using $SiO_2$ as the gap material 702. This may be due to lower light absorption in the slot waveguide. The lapping tolerance at 90% efficiency as shown in FIG. 9A is 22 nm, which is 3σ of current lapping accuracy (σ=6-7 nm). The optical spot size FWHM in the middle of the recording is 26-nm along X direction and 39 nm along the Z direction, which is similar to the configurations using $Al_2O_3$ as the gap material.

As previously described, the NFT and associated components are formed using layer deposition techniques and other processes associated with semiconductor wafer fabrication. In the following diagrams, various techniques are described that may be used to form any of the embodiments described herein. A first approach will be referred herein as a "bottom-up" approach, in which case the dielectric channel waveguide is considered the "bottom," and the plasmonic elements 106 forming the NFT are deposited on top. The bottom-up process is generally illustrated in FIGS. 11A-11E and 12A-12E, and in the flowchart of FIG. 16.

Figures 11A, 11B:
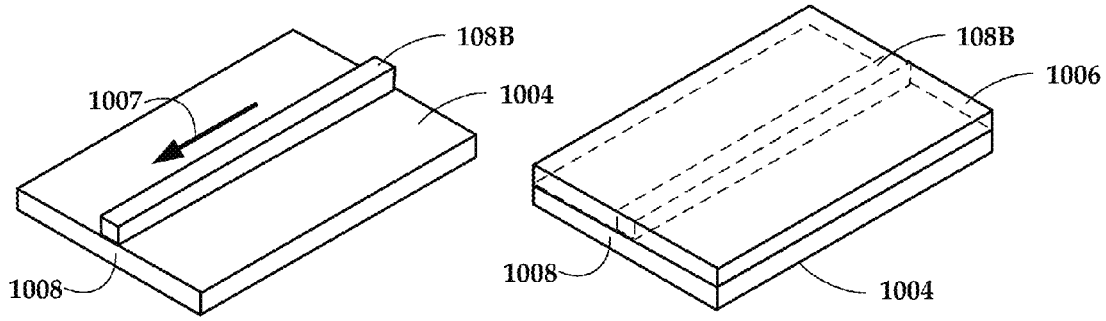
FIGS. 11A-11E and 12A-12H are respective perspective and cross sectional views illustrating a manufacturing process used to form a near field transducer and waveguide according to example embodiments.

In reference now to FIG. 11A, a perspective view of a waveguide core 108B on a dielectric layer 1004 shows a beginning step of the bottom up process. The core 108B is elongated along a delivery axis 1007 and extends to a media-facing surface 1008 (e.g., ABS). The media facing surface 1008 may be moved closer to the NFT (e.g., metallic elements 1102 shown in FIG. 11C) during later stages of processing, e.g., by trimming the substrate and layers near to a narrowed tip of the NFT. The waveguide core 108B may be formed from any material described herein, such as $Ta_2O_5$ and $TiO_x$. The layer 1004 may be part of the surrounding cladding (e.g., cladding 223 seen in FIG. 2A), and may be formed from $Al_2O_3$, or any other suitable material. As seen in FIG. 11B, another layer 1006 of dielectric, e.g., $Al_2O_3$, is deposited, and then chemical-mechanical planarization (CMP) is performed to make the wafer flat. The CMP stops 50 nm above the surface of the core 108B, which defines the core to NFT distance (e.g., dimension 218 seen in FIG. 2A).

Figures 11C, 11D:
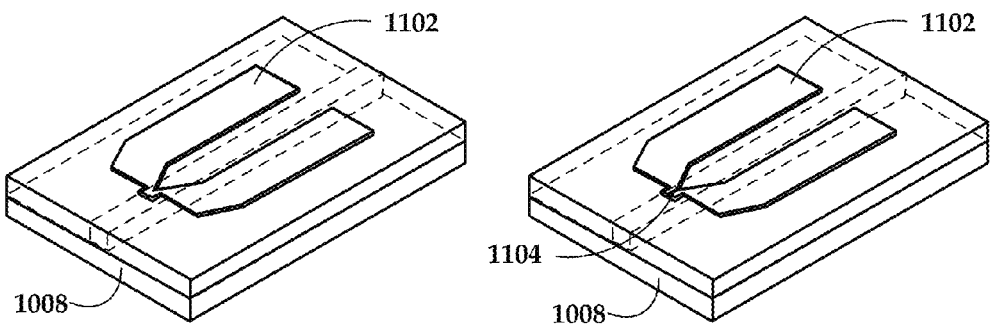

In FIG. 11C, a thin layer 1102 of plasmonic material (e.g., Au) is deposited to tip thickness (e.g., thickness 210 seen in FIG. 2A). The processes shown in FIGS. 11A-11C are also described in blocks 1062 and 1604 of FIG. 16. The shape of the layer 1102 may be defined by way of lithographic deposition/etching, and is generally shaped as two metal elements with a gap therebetween joined at a narrow tip proximate the media surface. In FIG. 11C, the narrow NFT gap dimension (e.g., dimension 208 seen in FIG. 2A) is not defined, as this feature size may be difficult to form at this stage using current lithographic processes. Instead, as seen in FIG. 11D, a gap 1104 is etched/formed after defining the outer shape of layer 1102. After forming the outer shape of layer 1102, a number of techniques may be subsequently used to form the gap 1104. One of these techniques is shown in FIG. 11E, and another is shown in FIGS. 12A-12D.

Figure 11E:
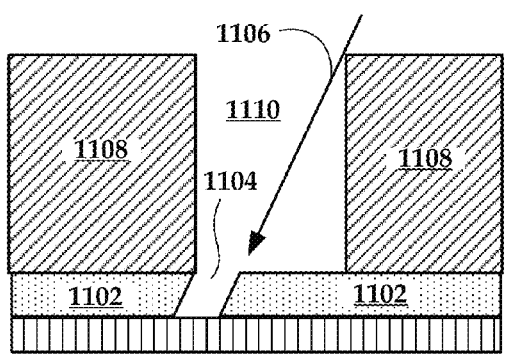

A first example of forming the gap 1104 is shown in FIG. 11E, where an angled mill 1106 may be used to form the gap 1104. Using the angled mill 1106 involves depositing a layer of photoresist 1108 on top of the plasmonic material 1102, and then cutting the material 1102 through a trench 1110 through the photoresist layer 1108. For example, where with a 100 nm trench opening 1100 in a 150 nm layer of photoresist 1108, a 25 degree tilting mill 1106 can be used to obtain a 30 nm gap 1104. This technique is also described in optional portion 1606 of FIG. 16.

Figure 12A:
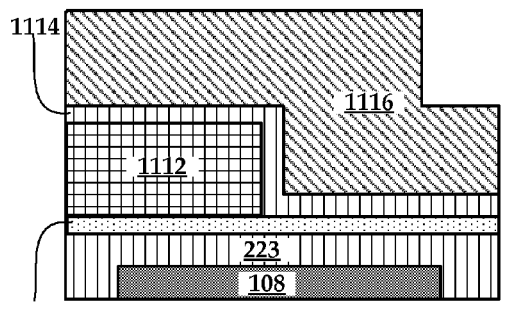
Figure 16:
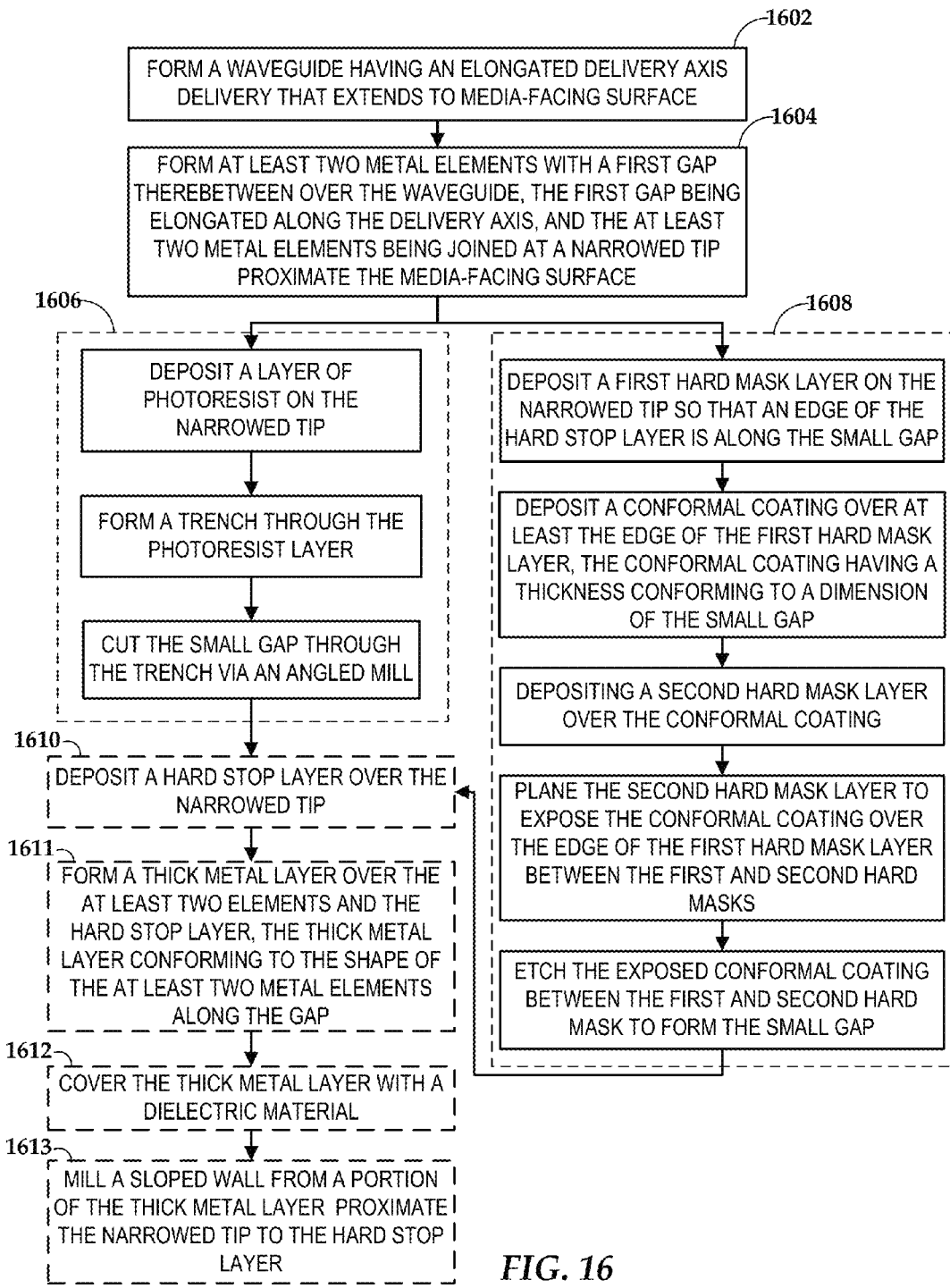
FIG. 16 is a flowchart illustrating a manufacturing process used to form a near field transducer and waveguide according to example embodiments.

Another example method to form the small NFT gap is referred to herein as "sidewall deposition," and is illustrated in FIGS. 12A-12D, and described in optional portion 1608 of FIG. 16. As seen in FIG. 12A, a mesa 1112 of hard mask material such as amorphous carbon (a-C) is formed on top of layer 1102 so that one side of the mesa 1112 is positioned along the desired gap location (e.g., gap 1104 seen in FIG. 12D). Then a thin layer 1114 (e.g., 30 nm) of alumina ($Al_2O_3$) is deposited, e.g., through atomic layer deposition (ALD) on top of the mesa 1112 and plasmonic material 1102. This layer 1114 is conformal so that the coating on the sidewall of mesa 1112 is the same thickness (e.g., 30 nm) as on the horizontal surfaces. Then a layer 1116 of Cu is deposited over the alumina layer 1114.

Figure 12B:
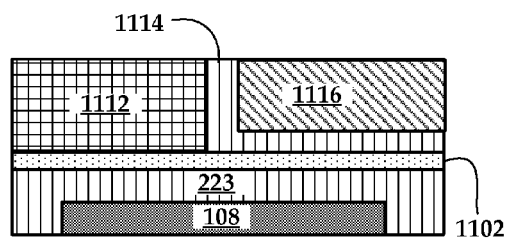
Figure 12C:
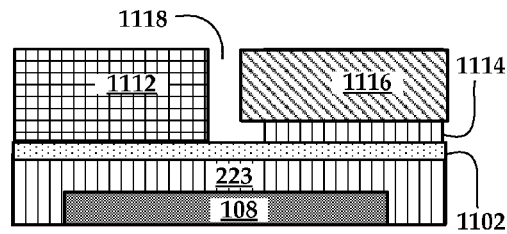
Figure 12D:
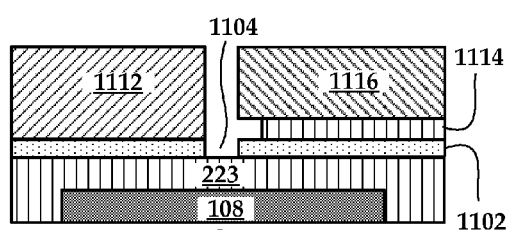

As seen in FIG. 12B, CMP is performed to remove the Cu and alumina layer from the top of the a-C mesa 1112. Next, as seen in FIG. 12C, a void 1118 is formed by wet-etching the vertical part of layer 1114. Finally, as shown in FIG. 12D, the gap 1104 conforming to the desired dimension (e.g., 30 nm) can be milled using the remaining a-C 1112 and Cu 1116 material as a hard mask. Afterwards, the a-C layer 1112 can be ashed away, and the Cu layer can be wet etched away (not shown).

Figure 12E:
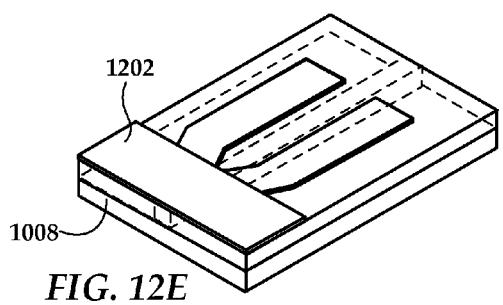
Figure 12F:
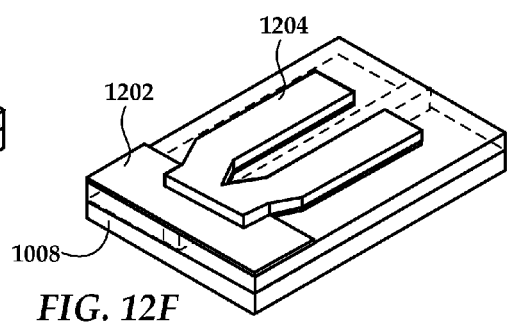
Figure 12G:
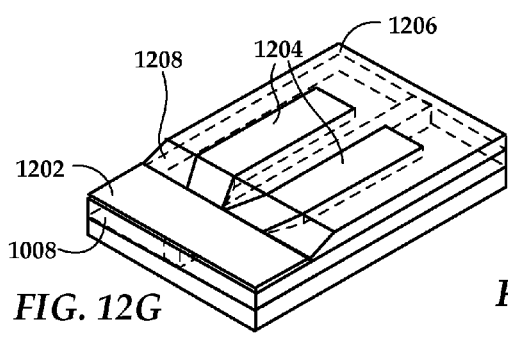
Figure 12H:
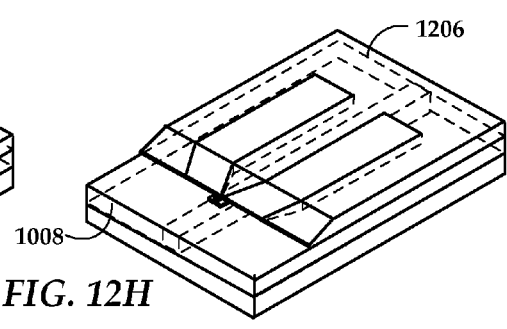

After formation of the NFT tip as shown in FIG. 11E or FIGS. 12A-12D, a thin (e.g., 20-30 nm) a-C stop layer 1202 can be laid over the tip portion of the NFT (e.g., using $O_2$ ashing) as seen in FIG. 12E. This process is also described in optional blocks 1610-1613 of FIG. 16. In FIG. 12F, a thick portion 1204 of plasmonic material used for the metal elements the NFT has been formed using a plating or liftoff process. As seen in FIG. 12G, another layer of alumina 1206 can be deposited around the material 1204. The top surface of alumina 1206 and the NFT material 1204 can be planed using CMP. Afterwards, sloped wall 1208 can be formed using reactive ion beam etch (RIBE) milling stopping at the a-C stop layer 1202. Finally, as seen in FIG. 12H, the a-C layer 1202 has been ashed away to show the final structure of the NFT metal elements (e.g., elements 106 seen in FIG. 1).

Figure 13A:
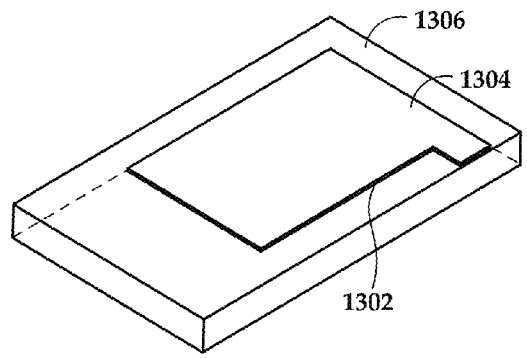
FIGS. 13A-13F are perspective views illustrating manufacturing processes used to form a near field transducer and waveguide according to another example embodiment.
Figure 13B:
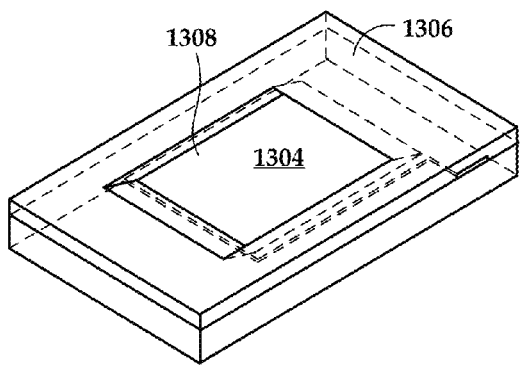
Figure 17:
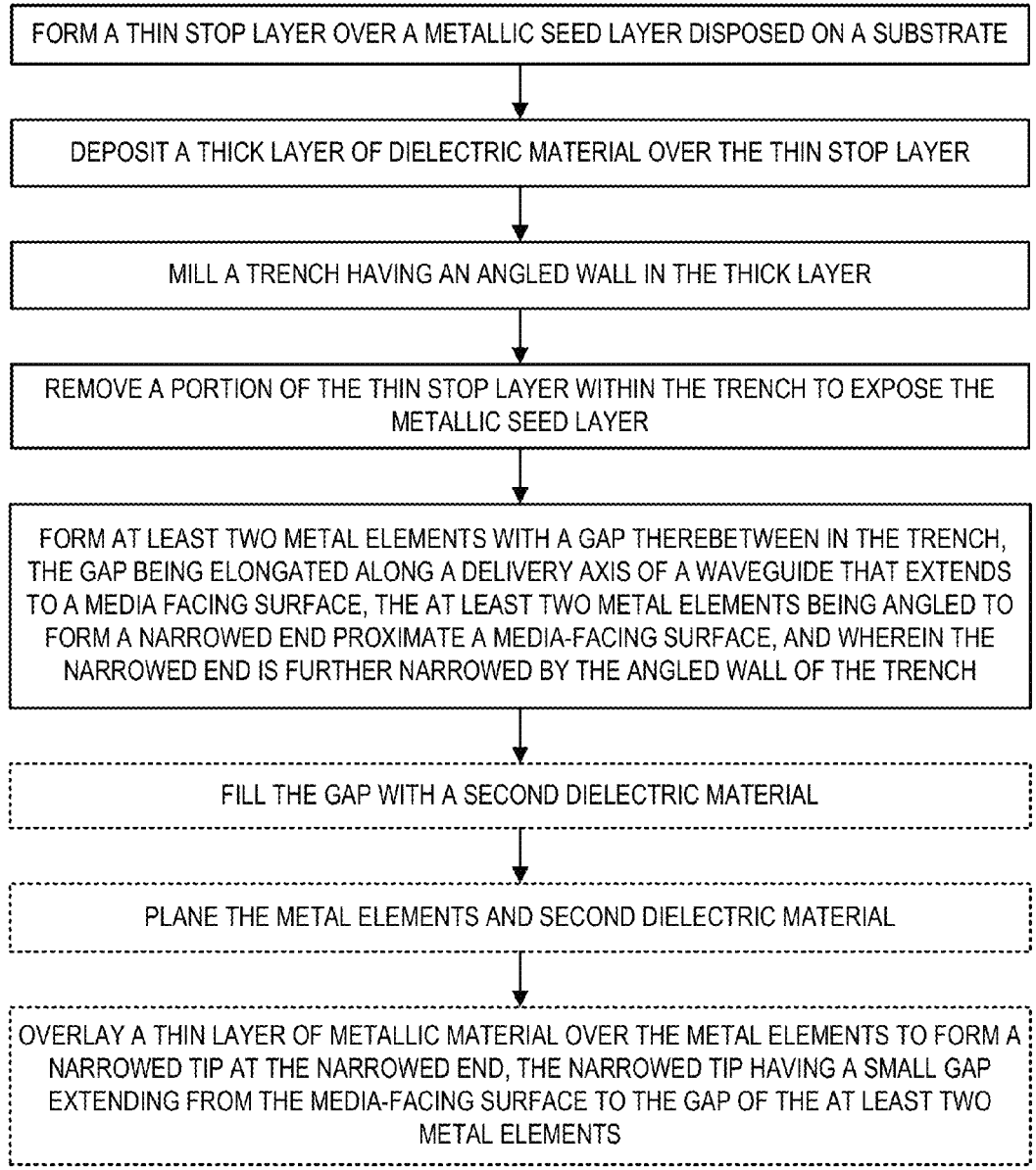
FIG. 17 is a flowchart illustrating a manufacturing process used to form a near field transducer and waveguide according to another example embodiment.

As mentioned above, a second process may be used to form the NFT embodiments described herein. This second process, which is shown by way of example in FIGS. 13A-13F, is referred to as the "upside down" approach. This approach is also shown in the flowchart of FIG. 17. As seen in FIG. 13A, a thin (e.g., 10 nm) seed layer 1302 of plasmonic material (e.g., Au) and a thin (e.g., 20 nm) a-C stopping layer 1304 are deposited on a substrate (not shown). These 1302, 1304 layers can be patterned by etching, and a relatively thick (e.g., 220 nm) layer 1306 of alumina is deposited thereafter. As seen in FIG. 13B, a 20 degree slope trench 1308 is RIBE milled through layer 1306, stopping on the a-C layer 1304.

Figure 13C:
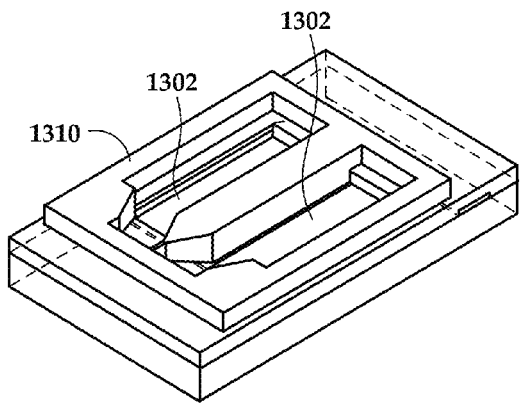
Figure 13D:
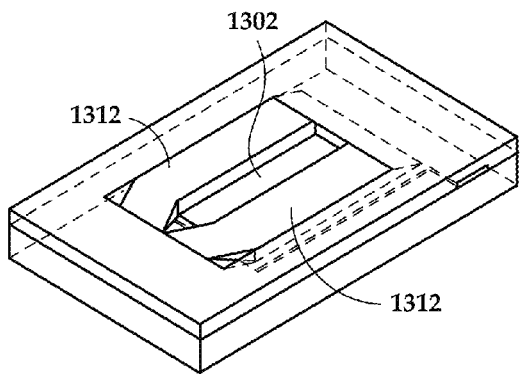
Figure 13E:
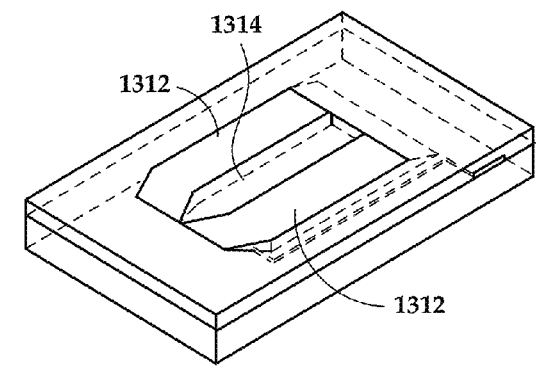
Figure 13F:
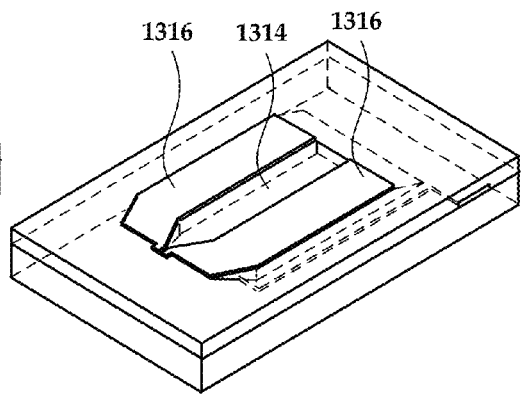

In reference now to FIG. 13C, a portion of the a-C layer 1304 exposed in the trench 1308 is ashed away, leaving the plasmonic seed layer 1302 exposed. Then, a photoresist layer 1310 may be applied, which will be used to pattern the thick part 1312 of the NFT metal elements (see FIG. 13E), after which the photoresist 1310 is removed. Alternatively, the thick part 1312 of the NFT could be created using a liftoff process, as represented by FIG. 13D. In reference now to FIG. 13E, the seed layer 1302 may be slightly milled away after removal of photoresist (if used), and alumina is deposited to fill the voids, e.g., in gap portion 1314. This can then be CMP processed to plane the top surface and set the desired thickness of plasmonic elements 1312. On top of this surface, as seen in FIG. 13F, a thin (e.g., 30 nm) layer 1316 of plasmonic material is deposited to form the thin portion of the NFT with tip shape 112. At this point, the thin layer 1316 can be overlaid with dielectric and waveguide portions (not shown) in an arrangement similar as that shown in FIG. 11A-11D and a media-facing surface formed, e.g., by cutting the assembly near the narrow tip of the NFT.

Figure 15A:
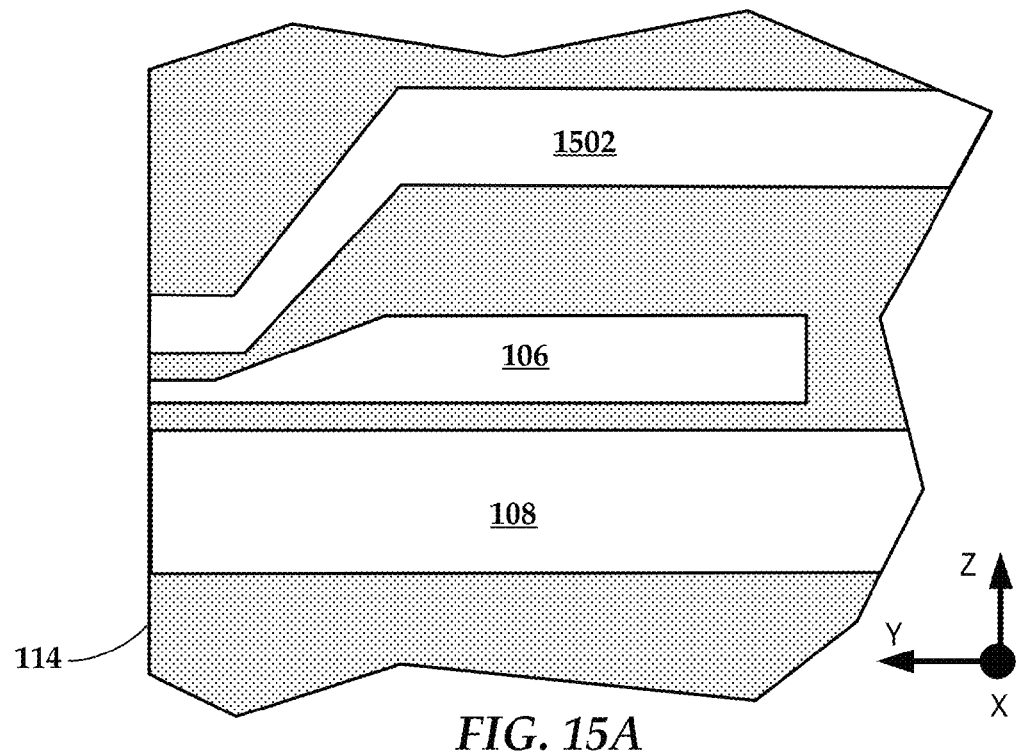
FIGS. 15A-15B are cross sectional views of a near-field transducer and waveguide with proximate recording pole according to example embodiments.
Figure 15B:
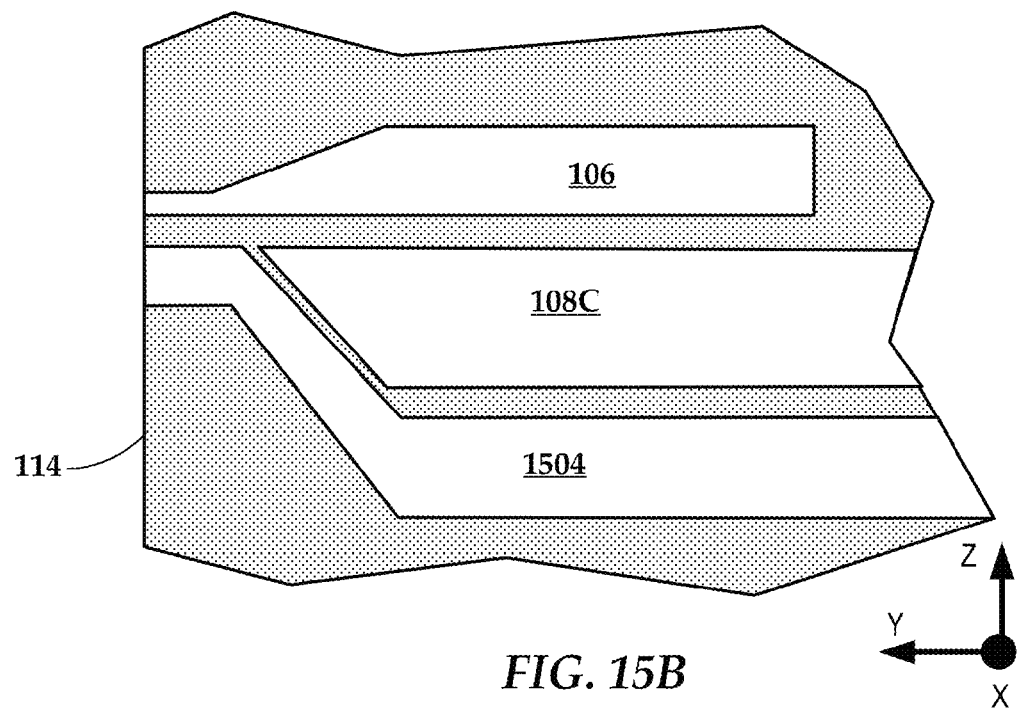

Because the NFT described hereinabove may be part of a HAMR writing apparatus, a recording pole of a read/write head may be located in close proximity with the NFT. An example of how a recording pole 1502 may be positioned according to one example embodiment is shown in the cross sectional view of FIG. 15A. As in previous illustrations (e.g., FIGS. 1 and 2B), the waveguide core 108 may extend to at or near the writing surface (e.g., ABS) 114. In such a case, the recording pole 1502 may be placed on a side of the metal elements 106 opposite from the waveguide core 108. In an alternate configuration seen in FIG. 15B, a shortened waveguide core 108C may be disposed between the metal elements 106 and a recording pole 1504. In such a case, a portion of the recording pole 1504 proximate the ABS 114 may lie between the end of waveguide core 108C and the ABS 114.

The foregoing description of the example embodiments has been presented for the purposes of illustration and description. It is not intended to be exhaustive or to limit the invention to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus comprising:
   a plasmonic transducer that includes at least two metal elements with a gap therebetween, wherein the metal elements are elongated along a plasmon-enhanced, near-field radiation delivery axis, and wherein cross sections of the metal elements in a plane normal to the delivery axis vary in shape along the delivery axis; and
   a waveguide disposed along an elongated side of the plasmonic transducer and overlapping the plasmonic transducer on a substrate-parallel plane, wherein the waveguide is optically coupled to the plasmonic transducer along the elongated side.

2. The apparatus of claim 1 wherein the cross sections become narrower in a down track direction at an output end of the plasmonic transducer.

3. The apparatus of claim 2, wherein the gap becomes narrower in a cross track direction at the output end of the plasmonic transducer.

4. The apparatus of claim 3, wherein each of the metal elements comprise a tip of constant cross-sectional shape along the delivery axis separated by the narrowed gap at the output end of the plasmonic transducer.

5. The apparatus of claim 1, wherein the metal elements each comprise:
   a tip portion proximate an output end of the plasmonic transducer;
   a taper portion coupled to the tip portion and increasing in cross sectional area away from the output end; and
   a coupling portion coupled to the taper portion and disposed along the waveguide to receive energy from the waveguide.

6. The apparatus of claim 5, wherein the coupling portion has a constant cross sectional area along the delivery axis.

7. The apparatus of claim 1, wherein the waveguide extends to an output end of the plasmonic transducer.

8. The apparatus of claim 1, wherein the metal elements are co-planar on the substrate-parallel plane.

9. An apparatus comprising:
   a plasmonic transducer that includes at least two metal elements with a gap therebetween, wherein the metal elements are elongated along a plasmon-enhanced, near-field radiation delivery axis and each comprise:
      a tip portion proximate an output end of the plasmonic transducer and having a first cross sectional area relative to a plane normal to the delivery axis;

a coupling portion at an input end of the plasmonic transducer and having a second cross sectional area relative to the plane that is greater than the first cross sectional area; and a taper portion coupled between the tip portion and the coupling portion, wherein the taper portion varies from the first to the second cross sectional area along the delivery axis.

10. The apparatus of claim 9, further comprising a channel waveguide disposed along the delivery axis proximate at least the elongated coupling portions of the metal elements.

11. The apparatus of claim 10, further comprising a dielectric layer disposed between a core of the waveguide and the metal elements.

12. The apparatus of claim 9, wherein the gap is 40 nm or less at the output end, and wherein the tip portions has a side dimension proximate the gap of 40 nm or less.

13. An apparatus comprising:
a plasmonic transducer that includes at least two metal elements with a gap therebetween, wherein the metal elements are elongated along a plasmon-enhanced, near-field radiation delivery axis and each comprise:
a tip portion proximate an output end of the plasmonic transducer and having a first cross sectional area relative to a plane normal to the delivery axis;
a coupling portion at an input end of the plasmonic transducer and having a second cross sectional area relative to the plane that is greater than the first cross sectional area and
a taper portion coupled between the tip portion and the coupling portion, wherein the taper portion varies from the first to the second cross sectional area along the delivery axis, wherein a combined length of the coupling and taper portions along the delivery axis is at least 30 times a length of the tip portion along the delivery axis.

14. The apparatus of claim 9, wherein the metal elements are co-planar on a substrate-parallel plane.

15. The apparatus of claim 9, further comprising a waveguide disposed along an elongated side of the plasmonic transducer and overlapping the plasmonic transducer on a substrate-parallel plane.

16. The apparatus of claim 13, further comprising a waveguide disposed along the delivery axis proximate at least the elongated coupling portions of the metal elements and overlapping the plasmonic transducer on a substrate-parallel plane.

17. The apparatus of claim 16, further comprising a dielectric layer disposed between a core of the waveguide and the metal elements.

18. The apparatus of claim 13, wherein the gap is 40 nm or less at the output end, and wherein the tip portions has a side dimension proximate the gap of 40 nm or less.

19. The apparatus of claim 13, wherein the metal elements are co-planar on a substrate-parallel plane.

* * * * *